United States Patent
Lundberg

[11] 3,947,387
[45] Mar. 30, 1976

[54] NOVEL IONIC FOAMS

[75] Inventor: Robert D. Lundberg, Somerville, N.J.

[73] Assignee: Exxon Research and Engineering Co., Linden, N.J.

[22] Filed: Feb. 6, 1975

[21] Appl. No.: 547,639

Related U.S. Application Data

[63] Continuation-in-part of Ser. No. 346,093, March 29, 1973, Pat. No. 3,867,319.

[52] U.S. Cl...... 260/2.5 R; 260/2.5 H; 260/2.5 HA; 260/260 HB; 260/30.6 R; 260/30.8 R; 260/31.8 AN; 260/31.8 G; 260/31.8 H; 260/32.6 R; 260/32.6 N; 260/32.6 PQ; 260/33.4 R; 260/33.4 PQ; 260/33.6 UA; 260/33.6 PQ

[51] Int. Cl.² .................... C08F 47/10; C08J 1/28

[58] Field of Search ..... 260/2.5 H, 2.5 HA, 2.5 HB, 260/2.5 R

[56] References Cited
UNITED STATES PATENTS

| | | | |
|---|---|---|---|
| 2,764,563 | 9/1956 | McMaster et al. | 260/79.3 R |
| 2,764,576 | 9/1956 | Blaser | 260/79.3 R |
| 2,928,130 | 3/1960 | Gray | 260/2.5 E |
| 3,098,832 | 7/1963 | Pooley et al. | 260/2.5 E |
| 3,322,734 | 5/1967 | Rees | 260/79.3 MU |
| 3,452,123 | 6/1969 | Beckmann et al. | 260/2.5 HA |
| 3,522,222 | 7/1970 | Taylor | 260/80.78 |
| 3,522,223 | 7/1970 | Taylor | 260/93.7 |
| 3,577,357 | 5/1971 | Winkler | 260/2.5 HB |
| 3,663,466 | 5/1972 | Jablonski | 260/2.5 HB |
| 3,676,378 | 7/1972 | Heil et al. | 260/2.5 HB |

OTHER PUBLICATIONS

C. J. Bennings, "Plastic Foams" II, Appendix AII, (Wiley Interscience, 1969).

*Primary Examiner*—Murray Tillman
*Assistant Examiner*—T. De Benedictis, Sr.
*Attorney, Agent, or Firm*—R. J. Baran

[57] ABSTRACT

This invention relates to novel foamed polymeric products which are prepared by foaming an ionic polymer in the presence of a volatile polar compound which acts as a plasticizer for the ionic groups present in said ionic polymer. The ionic polymer comprises from about 0.4 to 10 mole % pendant acid groups, especially sulfonic acid groups which have been neutralized to a degree of at least 97%, preferably 100%. In a most preferred embodiment of the instant invention, the foamed polymeric product is prepared from a sulfonated polystyrene polymer. This high strength, low density foam of the instant invention can be reprocessed by admixing with a low boiling solvent for the sulfonate groups, e.g., methanol, and repeating the above foaming process.

13 Claims, 1 Drawing Figure

VARIATION OF VISCOSITY WITH EXTENT
OF NEUTRALIZATION FOR SULFOPOLYSTRENE

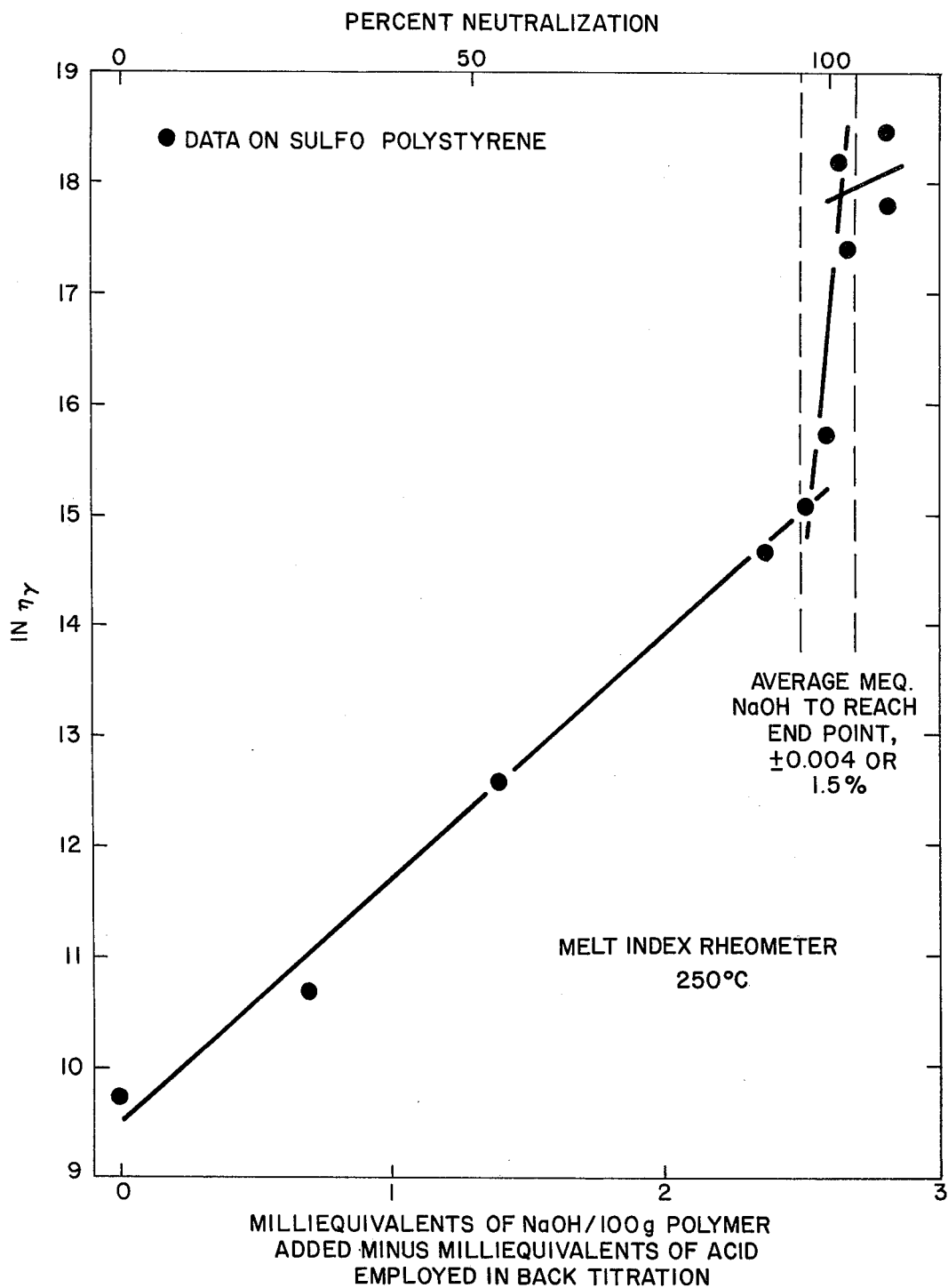

NOVEL IONIC FOAMS

CROSS REFERENCE TO RELATED APPLICATIONS

This application is a Continuation-in-part of U.S. Ser. No. 346,093, filed in the name of R. D. Lundberg on Mar. 29, 1973, now U.S. Pat. No. 3,867,319.

BACKGROUND OF THE INVENTION

1. Field of the Invention

This invention relates to novel foamed polymeric products which are prepared by foaming an ionic polymer in the presence of a volatile polar compound which acts as a plasticizer for the ionic groups present in said ionic polymer. The ionic polymer comprises from about 0.4 to 10 mole % pendant acid groups, especially sulfonic acid groups which have been neutralized to a degree of at least 97%, preferably 100%. In a most preferred embodiment of the instant invention, the foamed polymeric product is prepared from a sulfonated polystyrene polymer. This high strength, low density foam of the instant invention can be reprocessed by admixing with a low boiling solvent for the sulfonate groups, e.g., methanol, and repeating the above foaming process.

2. Description of the Prior Art

Foamed plastics have represented one of the fastest growing markets in the polymer industry in the past 15 years. This growth is expected to continue, and it is claimed that the potential usage of foamed plastics could far exceed the ability of the plastics industry to supply the needed materials.

There are essentially only two major flexible foam products now available in any large volume. They are polyurethane foam and plasticized poly (vinylchloride) foam. At this time, semiflexible foamed polyolefins are being commercialized for special applications; however, these do not represent large volume products.

Flexible polyurethane foams are normally prepared by the reaction of a diisocyanate, a hydroxyl terminated polyol, water, surfactant, catalysts, and possibly an external blowing agent. When these are intimately blended, a number of reactions occur very rapidly. In a matter of seconds a polymer is formed, expanded and cross-linked. The timing of polymerization and expansion is critical and is controlled by the catalysts, surfactants, and relative concentration of the diisocyanate and water.

The various chemical reactions which can occur are exceedingly complex and have been the subject of numerous publications and thirty years of intensive research. Furthermore, the diisocyanates employed in such studies are expensive and quite toxic, such that they can provide severe hazards to the personnel performing these reactions. It is also evident that after achieving a cured polyurethane foam, the process is irreversible. Therefore, if the resulting product does not meet specifications, it is of little or no value.

These problems are cited to demonstrate that despite almost overwhelming problems and major expense, these polyurethane systems have grown to their present volume due to product performance and market need.

A second flexible foam system which has achieved commercial success is that of foamed polyvinylchloride (PVC), suitably pasticized to yield a flexible cellular product. These materials are higher density (12 to 20 lbs./cu. ft.) than polyurethanes (as low as 1–2 lbs./cu.ft.). Vinyl foam is expanded by the use of chemical blowing agents near the melting point of PVC. These expand to generate the cellular structure. Deficiencies of PVC foamed systems are the difficulties of achieving low foam densities, lack of strength of the foams at high temperature (since they are not chemically cross-linked, these systems can collapse without close control of foaming temperature) and restriction of the foaming concept to a single base polymer, that of PVC.

U.S. Pat. No. 3,322,734 teaches that ionic polymers, for example, partially sulfonated polystyrene and partially carboxylated polystyrene, can be employed as plastics for molding objects and utilized to prepare foams. The present invention differs from that patent on a number of very important points. U.S. Pat. No. 3,322,734 teaches that the presence of a modest amount of carboxyl or sulfonic acid groups, if neutralized to a critical degree, permits processability by conventional plastic processes at elevated temperatures, and yet retains ionic associations at ambient temperature. The neutralization process simply involves reaction of the acid moiety with a suitable metal salt, metal oxide, metal hydroxide, etc. to a suitable extent. That art teaches that the acid form should not be completely neutralized — preferably the neutralization should be only 80% complete (i.e., the metal hydroxide or other compound should be added in an amount corresponding to 80% of the stoichiometric amount of acid present), and in no case should exceed 90% of the stoichiometric equivalence. (Similarly that patent teaches a minimum fraction of the acid groups must be neutralized, i.e., 10%). Thus it is emphasized clearly in the prior art that incomplete neutralization of the acid moiety is essential in order that the resulting products be fabricable. The patentee also discloses that the products that are neutralized to a level of more than 90% possess no significant advantages over the products of his claimed range.

Thus, those products are conventional plastic systems in that they respond to elevated temperatures and shear such that the ionic associations are diminished or virtually eliminated. Consequently flow occurs and the products can be molded or foamed much like conventional thermoplastics, such as polystyrene or polyethylene. Similarly, if one creates a foam from these ionic polymers, and exposes it to elevated temperatures (for example, 100° to 150°C.) the ionic interactions are diminished and flow occurs — that is, the foam collapses. The dimensional stability of such materials at elevated temperatures is inherently poor.

The present invention differs from the ionic polymer foams disclosed in the prior art in the following critical areas:

a. The products of the present invention are neutralized to a degree of at least 97% and are preferably neutralized completely.

b. The neutralized compositions of this invention are not readily processed by plastics processing equipment even at very high temperatures because, in the absence of a suitable additive, the ionic groups are very strongly associated.

c. The products, as described here, due to their strong associations, behave as crosslinked polymers at very high temperatures, manifesting unusual and valuable dimensional stability.

d. These associations of these ionic polymers are broken up by the addition of suitable agents which disrupt the ionic domains, permits the foaming process, and then removes itself from the vicinity of the ionic groups.

e. In the absence of these suitable plasticizing agents these products are not foamed into desirable products under practical conditions because the strong ionic associations preclude formation of a stable, desirable cell structure.

It is evident from this earlier discussion that chemically cross-linked foams possess certain advantages, especially resistance to flow at elevated temperatures. However, such advantages are achieved at a substantial cost in complexity of chemical reactions, in processing problems, inability to reuse scrap, inability to refoam defective parts, etc.

On the other hand, conventional thermoplastic foams, such as polystyrene foams, polyvinyl chloride foams, ionic polymer foams of the prior art etc. possess the virtues of easy processability, reuse of scrap, and simplicity of the foaming operation. Yet these systems all possess the failing of poor dimensional stability at elevated temperature. It is evident that for both classes of systems, chemically cross-linked foams and thermoplastic foams, each possess virtues and deficiencies which are inherent in their mode of preparation.

The present invention provides nearly all of the advantages of thermoplastic foams, and yet retains in the foamed part nearly all of the virtues of the chemically cross-linked foam.

SUMMARY OF THE INVENTION

It has now been unexpectedly discovered that novel foamed polymeric products may be prepared by foaming a mixture comprising an ionic polymer and a volatile polar compound which acts as a plasticizer for ionic groups present in said ionic polymer. In more detail, a mixture comprising an ionic polymer, said ionic polymer comprising from about 0.4 to about 10 mole per cent pendant acid groups, which have been neutralized to a degree of at least 97%, a foaming agent, and a volatile polar compound is heated to a temperature at which foaming occurs, cooled, and the novel foamed products of the instant invention, recovered. The term neutralized to a degree of at least 97%, means that at least 97% of the acid groups have been converted to the corresponding ionic group, i.e., sulfonic acid groups have been converted into sulfonate groups.

The polar compound is further characterized as being a preferential plasticizer for said pendant ionic groups that is, it will have substantially no effect on the nonionic portion of the polymer and having a boiling point that is not more than 100°C. above the foaming temperature, preferably not more than 50°C., and most preferably not more than 25°C. above the foaming temperature. If the volatile polar compound possesses a boiling point substantially above this value, it may not be sufficiently volatile, and foam collapse may occur. Furthermore, the boiling point of the volatile polar compound should not be too far below the foaming temperature, otherwise it will volatilize too quickly, giving either a dense foam or one whose cell structure is not optimized. Generally, it is possible to formulate around this latter problem by increasing the amount of the volatile polar compound, or by altering the length of time the composition is held at said foaming temperature. For most foaming operations, it is preferred that the boiling point of the polar compound be not greater than 100°C. below the foaming temperature (i.e. if the foaming temperature is 200°C., the boiling point of the polar compound should be at least 100°C.). It is possible under certain conditions, e.g. very rapid foaming processes to employ a more volatile polar compound, however, the process becomes more critical with respect to temperature and amount of additives than would be desirable. The time interval for the foaming process can be variable ranging from a time of 5 seconds to 15 minutes. The amount of the volatile polar compound which is employed will depend on its boiling point, the degree of polarity and the amount of ionic groups contained within the polymer. Thus, the amount of volatile polar compound employed should be enough to disrupt the ionic domains of the polymer but not so much that its removal will present substantial problems. Generally the amount will normally be in the range of from about 0.1 to about 50, preferably from about 0.2 to 20 moles plasticizer per moles of ionic groups. This process is useful for forming foamed polymeric products in any of the forms known in the prior art and, unlike the prior art foaming processes leading to cross-linked foams, allows the reuse of scrap foamed polymers, that is, the foamed polymers of the instant invention may be reprocessed.

The reprocessing of the scrap foamed polymers may be accomplished in several ways — for example, by dissolving the polymer in a solvent mixture comprised of a solvent for the polymer backbone and a polar compound (such as an alcohol) for the ionic domains. This solution may be precipitated to yield the bulk polymer, which can then be formulated with proper forming agents and volatile polar compound. Alternatively the scrap foamed polymer can be combined with a suitable volatile polar compound and then processed using thermoplastic techniques and subsequently combined with additional unprocessed polymer. The resulting blends can be formulated with foaming agent and additional polar compounds, and subsequently refoamed.

This advantage of reprocessing scrap foamed polymer results from the fact that the foamed products of the instant invention have physical crosslinks and not the chemical crosslinks known in the prior art. Physical crosslinks result from the interactions of the pendent ionic groups. The polar compound disrupts these interactions, thus the foam behaves as any uncrosslinked foam; for example, it can be readily dissolved in appropriate solvents. After foaming, the polar compound, because of its volatility, is removed from the foamed products leaving behind the strong and temperature resistant physical crosslinks.

The process is admirably suited to the preparation of foamed sheet (for example, in extrusion), foamed pellets and foamed molded samples. Furthermore, due to the excellent dimensional stability of the foamed plastic products, these can be heated subsequent to the foaming process and stamped or forged into complex foamed articles simply by a stamping and cooling cycle. The cooling of the plastic foamed article below its softening temperature permits the retention of complex configurations. Similarly this process permits the preparation of foamed articles which have a foamed surface of relatively high density, and an interior core of substantially lower density. Such foamed articles possess relatively high strength to weight ratios.

The appended drawing illustrates graphically the variation of viscosity with the extent of neutralization of sulfopolystyrene.

The instant invention is related to U.S. Ser. No. 199,799, filed Nov. 17, 1971, in the names of R. D. Lundberg and H. S. Makowski, but differs therefrom, in that the instant invention relates to a novel ionomer foam, and the process for making said foam, while U.S. Ser. No. 199,799 discloses and claims a process for fabricating articles from said ionomer, which comprises a. adding a sufficient volatile preferential plasticizer to said ionomer, said plasticizer having a boiling point substantially above the softening point of the ionomer backbone;
b. heating said ionomer to a temperature between the softening point of the backbone and the boiling point of the plasticizer;
c. forming said ionomer in a first desired shape at the temperature specified in step (b);
d. evolving said volatile plasticizer;
e. re-forming the product of step (d) in a second desired shape; at a temperature above the softening point of the backbone but below the ultimate softening point; and
f. cooling below the softening point of the backbone.

The foaming agents which may be used in the process of the instant invention are well known in the art and include compounds that decompose at the temperature of foaming to liberate gases, and the low boiling liquids which are converted into gaseous form by heating.

Examples of foaming agents which decompose at specific temperatures to liberate gases include the following representative compounds for which the approximate temperature range of decomposition is indicated in parenthesis: sodium bicarbonate (160°–200°C.), sodium bicarbonate and citric acid combination (0°C. to 200°C.), azobis formamide (160°–200°C.), azobisisobutyronitrile (90°–115°C.), diaxoaminobenzene (90°–110°C.), N,N'dimethyl-N,N'-dinitrosoterephthalamide (90°–105°C.), N,N'-dinitrosopentamethylenetetramine (130°–190°C.), toluene-4-sulfonyl hydrazide (100°–110°C.), 4,4'-oxybis (benzene sulfonyl hydrazide) (120°–140°C.), and similar compounds known in the art. (For example, see reference "Plastic Foams"; Vol. II, by C. J. Bennings, Wiley Interscience Publishers, 1969, Appendix A-II). Generally, from about 0.02 to 20 weight %, preferably from 1 to 5 weight %, based on ionic polymer of said foaming agents, will be used in the process of the instant invention.

The low boiling liquids which can be utilized are those which boil at a suitably low temperature to allow for convenient foaming. For example, these liquids must volatilize at a temperature where the polymer flows. When preparing a plastic foam, the boiling point of the liquids can be extremely low, even below room temperature, because if they are suitably dispersed in a solid plastic polymer they will not readily vaporize until the polymer reaches a temperature at which it flows. Examples of such suitable liquids are pentane, hexane, heptane, benzene, toluene, methylene chloride, trichloroethane, 1,2-dichloroethane and the like. Similarly materials, which are gases at room temperature, may be employed include carbon dioxide, ammonia, dichlorodifluoromethane, sulfur dioxide, nitrogen and the like. Preferably the low boiling liquids are either solvents or partially soluble in the nonionic polymer phase. For example, when a partially sulfonated polystyrene polymer is utilized in the instant invention, the foaming agent is preferably a liquid with some solubility in polystyrene. Preferably the low boiling liquid will have a boiling point of less than 200°C., more preferaly less than 150° C. preferably Sufficient liquid or solvent must be used to provide a foam of the proper density. Under some circumstances this solvent will actually dissolve the polymer and in these cases, there will be a large excess of the solvent. In other cases where the low boiling liquid is only sparingly soluble in the polymer, only modest amounts are required. In general, the amount of low boiling liquid (foaming agent) will range from about 1 to about 300 weight percent, bases on the ionic polymer, more preferably from about 2 to about 50 weight percent, and most preferably from about 3 to about 25 weight percent.

Ionic polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, copolymers of any of the above, sulfonated polyisobutylene, sulfonated ethylene-propylene terpolymers, sulfonated polyisoprene, and sulfonated elastomers and their copolymers. Sulfonated copolymers of ethylene and/or propylene and a nonconjugated diene, e.g. 1,6-hexadiene, are especially useful in preparing the foamed products of the instant invention. The ionic polymers of the invention also include plasticized compositions of the above; for example, a plastic ionic polymer, which when foamed according to the process of the instant invention will give a rigid foam, may be suitably plasticized prior to foaming to give a flexible foam.

The ionic polymers which are used to prepare the foams of the instant invention comprise from about 0.4 to about 10 mole % pendant ionic groups. More preferably, ionic polymers comprise from about 0.5 to 8 mole % pendant ionic groups. These pendant ionic groups include carboxylate groups, sulfonate groups and phosphonate groups; most preferred are sulfonate groups. In accordance with the above the most preferred ionic polymers for utilization in the instant invention to prepare rigid plastic foams comprise partially sulfonated polystyrene and polystyrene derivatives, i.e. t-butyl styrene and other alky styrenes comprising from 9 to 20 carbon atoms. Ionic polymers derived from elastomeric polymers such as sulfonated polyisobutylene copolymer, and sulfonated ethylene-propyleneethylidene norbornene and ethylene-propylene-1,5-hexadiene terpolymers are preferred ionic polymers for utilization in the instant invention for the preparation of flexible foams.

The flexible foams derived from elastomeric polymers such as sulfonated ethylene-propylene-ethylidene norbornene terpolymers are highly prized for their very elastic properties, good low temperature flexibility, and ability to recycle the foamed objects. These ionic elastomers are also useful since they can be highly extended with rubber process oils and mineral fillers or carbon black to give compounded formulations which can be readily foamed. In such cases the sulfonated ethylenepropylene terpolymer can represent only 30 to 50% by weight of the final formulation and yet provide excellent foam properties.

Similarly, the ionic polymers of this invention can be combined with other nonionic polymers, both plastic or elastomeric in nature without having a substantial deleterious influence on the foam process or on the resulting foam properties, as long as the ionic polymer represents at least 51% of the total polymer composition. See, for example, U.S. Ser. No. 524,502, and U.S. Ser. No. 524,512, both filed on Nov. 18, 1975, in the names of Bock et al. and Lundberg et al., respectively, for examples of these materials.

The ionic groups present in the ionic polymers of the instant invention are derived from neutralization of pendant acid groups. For example, if a sulfonic acid derivative is employed as the intermediate, sufficient metal hydroxide may be added to neutralize at least 97% of the acid groups. Even that residual 3% of unneutralized acid groups can have a deleterious influence on the strength of the physical crosslinks derived from the ionic association. For that reason it is preferred that greater than 98% of the acidic intermediate species be neutralized, and it is most preferred that essentially all of the pendant ionic groups be neutralized. It is also possible to add sufficient basic metal hydroxide or oxide to overneutralize without any specific benefit other than to insure complete neutralization. From a practical viewpoint, it is preferred that this excess of base be kept to no more than 50 mole percent beyond the stoichiometric equivalence of the pendant acid groups. The neutralizing agents are selected from the group consisting of ammonia, primary, secondary and tertiary amines having up to 30 carbons; basic compounds selected from Groups I and II of the Periodic Table of the Elements, e.g. sodium hydroxide, potassium hydroxide, calcium hydroxide, and magnesium hydroxide and basic lead, tin and antimony compounds.

Preferably the neutralizing agent is selected from the group consisting of basic metal compounds wherein the metal is selected from Groups I and II of the Periodic Table of the Elements. Ammonia and amine neutralizing agents are not in the preferred class, because they yield lower strength foams as compared to the corresponding foams, which are prepared by neutralization with basic Groups I or II metal compounds. When, in fact, ammonia or amines are utilized as neutralizing agents, the degree of neutralization should be greater than 98%, preferably 100%. The basic lead, tin and antimony compounds are not in the preferred class of neutralizing agents because they yield foams which are difficult to fabricate. Preferably the basic metal compounds selected from Groups I and II of the Periodic Table, and the basic lead, tin and antiomony compounds, are hydroxides, oxides, or $C_1$ to $C_{20}$ alkoxides or carboxylates. The most preferred neutralizing agents are selected from the group consisting of the hydroxides, oxides, or $C_1$ to $C_{20}$ alkoxides, or carboxylates of calcium, barium, magnesium, sodium and potassium.

The choice of the polar compound, within the scope of the parameters disclosed above is also illimitable. Preferably, the polar compound boils from 100°C. below to about 50°C. higher than the temperature at which foaming takes place.

The polar compound or substance can be defined as having a dipole moment of greater than 0.9 debyes. Preferably the polar compound should have a dipole moment from 1.2 to 5.5 debyes and a boiling point less than 200°C. Finally, the most preferred polar compounds are those having a dipole moment from 1.2 to 5.5 debyes and a boiling point less than 150° C. It is also possible to utilize a polar compound simultaneously as the blowing agent and as the plasticizer for the pendent ionic groups. While this is effective in generating foams, we have observed that the foams having the best cell structure and most convenient process are achieved by selecting the foaming agent and the polar compound independently to provide the most suitable system for a given set of foaming conditions.

When a low boiling solvent is utilized as the foaming agent, (compounds within the scope of this definition may be determined by any table which would give boiling points of such solvents) preferably the polar compound is chosen so as to be substantially immiscible with the low boiling solvent and thus the boiling points of the two are independent of each other.

While examples of suitable polar compounds fitting the constraints described will be listed below, it is important to note that the function of the polar compound is to relax the ionic associations prior to, and during, the foaming operation. Thus, the suitability of a polar compound to effect this relaxation can be determined experimentally in a number of ways. The most direct approach is to mix the polar compound with the ionic polymer and examine the melt viscosity of the mixture at an elevated temperature near that where it is desired to foam the polymer. If the melt viscosity of the mixture of polar compound and ionic polymer is lowered at least 5-fold from that of the ionic polymer alone at that same temperature, then it is apparent that the polar compound has effectively relaxed the ionic associations at that elevated temperature. We observe that even small amounts of alcohols (1 to 10 weight percent) can readily lower the melt viscosity of these ionic polymers by 10 to 100-fold or more at elevated temperatures, and for this reason alcohols are a highly preferred embodiment of the polar compound.

In general, alcohols having up to 20 carbon atoms and boiling at a temperature of from about 60° to 200°C. are the preferred polar compounds for use in the process of the instant invention. Specific alcohols within the scope of the invention include methanol, ethanol, propanol, n-butanol, sec-butanol, isobutanol, isopropanol, pentanol, hexanol, heptanol, decanol, benzyl alcohol, octanol, 2-ethyl hexanol, etc. Water may also be used in a similar manner. Other polar compounds which can be utilized include ammonia and $C_1$ to $C_{20}$ amines, such as ethylamine, methylamine, dimethylamine, triethylamine, $C_1$ to $C_{20}$ thiols such as methanethiol, ethanethiol, propanethiol, etc. As disclosed above, the ionic polymers of the instant invention include polymers in which the nonpolar phase is plasticized by a nonvolatile solvent for that phase. For example, the use of a plasticizer for the polystyrene phase of a homopolymer of polystyrene sodium sulfonate containing 5 mole % pendant sodium sulfonate groups may be determined as follows: One gram of polystyrene is dispersed in 100 ml of a nonvolatile solvent, such as dibutyl phthalate. The mixture is heated to about 80°C. to expedite the dissolution process, held for 4 hours, and cooled. If a true solution results, then that nonvolatile solvent is an excellent plasticizer for the polystyrene phase. This type plasticizer will be referred to as chain plasticizer since it preferentially solvates the polymer chain backbone and has little or no effect on the ionic domains. It is necessary that the plastixizer have little effect on the domains, since unlike the volatile polar compound, it will not be removed during the foaming operation and thus the benefits of having associated ionic groups in the fabricated foam will not inhere. The purpose of these type plasticizers is to convert those polymers which would normally result in rigid foams into foams which are flexible and semi-elastomeric. The use of such chain plasticizers is limited to compounds which solvate the polymer chain and which have a boiling point of at least 150°C. and preferably 200°C. The chain plasticizer should also have a boiling point in excess of the temperature of the foaming process so that it will not be lost during the foaming, nor should it boil at or near any temperature at which the foamed products will be used. Specific chain plasticizers which can be used with the preferred sulfonated polystyrene polymers include di-n-hexyl adipate, dicapryl adipate, di-(2-ethyl hexyl) adipate, dibutoxy-ethyl adipate, benzyl-octyl adipate, tricyclohexyl citrate, butyl phthalyl butyl glycolate, butyl laurate, n-propyl oleate, n-butyl palmitate, dibutyl phthalate, dihexylphthalate, dioctylphthalate, tributyl phosphate, dioctyl sebacate and mixtures thereof.

The instant invention provides novel foamed products. The novel form products may have a density varying from 1 lb. per cubic foot to 50 lbs. per cubic foot, preferably from 5.0 lbs. per cubic foot to 30 lbs. per cubic foot, and include both rigid and elastomeric foams. These foams are novel in that they may be reprocessed unlike the crosslinked foams known in the prior art. Reprocessing may be easily carried out by dissolving the foamed polymer in a suitable solvent; that is, a mixture of a low boiling foaming agent and volatile polar compound which will plasticize the pendant ionic groups. This solvent combination may be the same one utilized in forming the original product or may be different. The only requirement is the volatile polar compound which is used as a portion of the solvent mixture for dissolving fabricated foam must be a plasticizer for the pendant ionic groups.

The novel foam products of the instant invention show two unexpected advantages over the prior art foams, prepared according to U.S. Pat. No. 3,322,734. The foams of the instant invention show improved high temperature dimensional stability and color stability. While not wishing to be bound by theory, it is believed that reasons for these unexpected advantages are:

1. The high temperature dimensional stability (which can be measured in stiffness modulus, tensile strength, or viscosity) is very sensitive to the level of neutralization in the region of 90% to 100%. This is illustrated in FIG. 1 where it is seen that the viscosity increases monotonically with neutralization over the region of 0 to 90% but undergoes a much more dramatic increase in the 90% to 100% neutralization region. This surprising viscosity behavior has very important practical implications. The resulting produces are not processable under practical conditions of high shear as observed in U.S. Pat. No. 3,322,734. However, this same viscosity behavior is believed to provide high temperature dimensional stability.

2. The more completely neutralized forms of the instant invention possess substantially better thermal stability than partially neutralized compositions because it is believed that the presence of significant amounts of free acid in these compositions has a deleterious effect on both the color of the compositions, and on the equipment employed to process these materials.

Very often in the preparation of commercial foam samples, nucleating agents are employed as additives to create a very uniform and small cell structure. These nucleating agents are well known to those versed in the art. Systems such as sodium bicarbonate and citric acid or calcium silicate are often employed. These additives can also be utilized in the foam produced in this invention.

The preferred ionic copolymers for use in preparing the foams of the instant invention, i.e. sulfonated polystyrene and substituted derivatives thereof, may be prepared by the following procedures:

I. Copolymerization with Sulfonate Containing Monomers

For example, alkali metal salts of styrene sulfonic can be copolymerized using free radical initiators with a variety of thermoplastic forming monomers such as styrene, t-butyl styrene, chlorostyrene, and the like.

II. Direct Sulfonation of Homopolymers

Sulfonic acid groups can be introduced into aromatic homopolymers such as polystyrene, polyvinyl toluene, poly-alpha-methylstyrene, poly-t-butyl styrene, and the like by direct reaction with a sulfonating agent. Sulfonating agents such as sulfuric acid and chlorosulfonic acid can be used. Preferred sulfonating agents are acetyl sulfate, i.e. the mixed anhydride of acetic acid and sulfuric acid ($CH_3COOSO_3H$), and sulfur trioxide complexes with dioxane, tetrahydrofuran, and trialkyl phosphates. Of the trialkyl phosphate complexes, thos consisting of trialkyl phosphate /$SO_3$ ratios of about 1.0 are most preferred. The resulting polymer now contains sulfonic acid groups which can be neutralized directly with metal oxide, metal hydroxide, or metal salts to achieve the desired metal sulfonate containing polymer. Alternatively, the sulfonic acid containing polymer can be isolated by precipitation and neutralized either in bulk or by redissolving the polymer.

III. Direct Sulfonation of Modified Polymers

Where desirable homopolymers cannot be directly reacted to produce sulfonate containing materials it is possible to introduce by copolymerization functional groups capable of reacting with sulfonating agents. The two most desirable functional groups for this purpose are double bonds and aromatic groups, especially phenyl groups; See U.S. Pat. No. 3,642,728 incorporated herein by reference for methods of sulfonating polymers containing olefinic unsaturation. Again the polymers are neutralized as described above.

A. Copolymers of Aromatic Monomers

Copolymerization of vinyl monomers and relatively small amounts of styrene or other vinyl aromatics reactive to sulfonating agents produces copolymers with essentially homopolymeric properties capable of being sulfonated. Illustrative examples of such copolymers are chlorostyrene-styrene, styrene-acrylonitrile, styrene-vinyl acetate, etc. In nonvinylic polymer systems an aromatic group can be introduced into the polymer through the use of an aromatic containing monomer, e.g., phenyl glycidyl ether copolymerized with propylene oxide. The reagents suitable for introducing sulfonic acid groups directly are the same as those described for the direct sulfonation of homopolymers (II). The polymers are neutralized as described above.

B. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the incorporation of unsaturation in vinyl polymers are conjugated diolefins, such as butadiene, isoprene, dimethyl butadiene, piperylene and nonconjugated diolefins, such as allyl styrene. Copolymers can be made by using any of the applicable initiating systems, i.e., free radical, cationic, anionic, or coordinated anionic. In polyethers unsaturation can be introduced by copolymerization with unsaturated epoxides, e.g., allyl glycidyl ether.

The reagents which are suitable for the direct introduction of sulfonic acid groups into unsaturated thermoplastics are the complexes of $SO_3$ with reagents such as dioxane, tetrahydrofuran, trialkyl phosphates, carboxylic acids, trialkylamines, pyridine, etc. Especially suitable are the trialkyl phosphate complexes, and the most preferred are the 1/1 complexes of $SO_3$/triethyl phosphate. The polymers are neutralized as described above.

IV. Oxidation of Sulfur Containing Functional Groups

Polymers which contain sulfinic acid groups can be readily air oxidized to sulfonic acids. Polymers containing mercaptan groups can be easily converted to the sulfonic acid groups through oxidation of the mercaptan groups with a variety of oxidizing agents, such as hydrogen peroxide, potassium permanganate, sodium dichromate, etc.

Ionic polymers of the instant invention would generally have a weight average molecular weight greater than 5,000, more preferably the molecular weight will range from 10,000 to 500,000, most preferably from 20,000 to 250,000.

In general, the foams of the instant invention are prepared by a process which comprises mixing an ionic polymer, which comprises from about 0.4 to 10 moles percent pendant acid groups, with a volatile polar compound which is a selective plasticizer for said ionic groups, and a foaming agent, heating to a temperature at which the foaming agent is converted into a gaseous form, and cooling to recover the novel foamed products of the instant invention. The acid groups described above are neutralized to a degree of at least 97%, preferably 98%, and more preferably 100%. The above mixture will comprise from 20 to 99 weight % of the ionic polymer, from 0.1 to 50 moles of volatile polar solvent per mole of pendant ionic group. If a low boiling liquid is utilized as the foaming agent, its weight may range from 1 to 300% by weight of said ionic polymer. When a foaming agent that decomposes to liberate gas is utilized, its weight may range from 0.02 to 20% by weight of said ionic polymer. The ionic polymer, volatile polar compound and foaming agent may be mixed in any order, preferably volatile polar compound is admixed with the ionic polymer and then the ionic foaming agent blended therein.

The mixture is generally heated to a temperature of at least 60°C., preferably greater than 100°C. to initiate foaming. Heating the mixture may be carried out by processes known in the art, for example in a forced air oven, or in conventional polymer fabrication equipment such as a heated extruder. The foaming may be carried out for from about 5 seconds to 15 minutes, preferably from about 30 seconds to 5 minutes. After the foaming agent is substantially completely converted to the gaseous form, and the volatile polar compound is substantially completely removed from the vicinity of the ionic groups, the foamed product is cooled below The novel foamed products of the instant invention may be reprocessed by dissolving in a mixture of a solvent for the non-ionic (backbone) portion of the ionic polymer, and a volatile polar compound which is a selective plasticizer for the pendant ionic groups present in said ionic polymer. The solvent may be removed by heating and the ionic polymer reformulated with a foaming agent and the above foaming process repeated.

The following are specific embodiments of the instant invention. There is no intention to be limited to the disclosure which said specific embodiments represent.

The following Example demonstrates the point described above relating melt viscosity to neutralization level of the sulfonated polymer.

EXAMPLE 1

Viscosity Behavior or Partially Neutralized Sulfonated Polystyrene

A study was made of the viscosity behavior of sulfonated polystyrene and partially neutralized products prepared therefrom by titration with sodium hydroxide. Sample designations are given in Table I together with the milliequivalents of NaOH added to the free acid.

TABLE I

Sulfonated Polystyrene and Partial Sodium Salts

| Sample | Meq. NaOH Added | % Neutralization |
|---|---|---|
| Base Resin A | 0 | 0 |
| B | 0.069 | 27 |
| C | 0.139 | 54 |
| D | 0.209 | 81 |
| E | 0.236 | 91 |
| F | 0.251 | 97 |
| G | 0.251 | 97 |
| H | 0.259 | 100 |
| -A -2 | 0.263 | 102 |
| -A -3 | 0.263 | 102 |
| -A -1 | 0.266 | 103 |
| I | 0.268 | 103 |
| J | 0.282 | 108 |

In Table I the percent neutralization is calculated on the basis of the average value obtained on 7 samples for the milliequivalents of base required to reach the titration end point. This value, representing 100% neutralization, is 0.259 ($2\sigma = 0.0095$). On the basis of this titration value the base resin free acid contained 2.69 ($2\sigma - 0.10$) mole % $SO_3H$. (Sulfur anlaysis on this base resin gave 2.48 mole % $SO_3H$).

Viscosity measurements were made on the above samples using the Melt Index Rheometer under several different conditions in order to cover the very wide viscosity range present with these samples. Measurements on the base sulfonated polystyrene resin were made at 190°C. using a 0.05 D × 1.0 inch L capillary at a shear stress of 2.1 × $10^5$ cynes/cm$^2$, and at 250°C. using a 0.05 D × 0.5 inch L capillary with a shear stress of 1.1 × $10^5$ dynes/cm$^2$. The viscosity values obtained under these conditions are given in the table below.

| Viscosity of Base Resin A | |
|---|---|
| Temperature, °C. | $\eta\tau$, poise |
| 190 | 2.4 × $10^5$ |
| 250 | 1.7 × $10^4$ |

The Figure gives a plot of the viscosity of the natural logarithim of samples studied as a function of the meq. of NaOH added/gram of free acid. The most striking feature of this plot is the discontinuity in the viscosity which occurs in the region of 100% neutralization. As percent neutralization is increased from 0 up to 100%, the viscosity of these products changes in a rather uniform way; however, at neutralizations in the interval from about 97–103% an abrupt change in viscosity of the products takes place. The viscosity change from 100% to 102% is of the order of 1.5 decades; whereas, for the same difference in neutralization below 100% the viscosity changes only by about 0.2 decade.

For the sulfopolystyrene samples, the region around 100% neutralization is one of interest. Within this range there is an uncertainty in the extent of neutralization actually accomplished due to the limits of precision of the bast titration. As indicated, the 2 $\sigma$ value of the titrration to the end point was found to be ±0.0095 meq./100 grams of free acid. This corresponds to an uncertainty of 3.7% on the percent neutralization. As a result samples which have been titrated to the end point could range in degree of neutralization from about 96 to 104%. In this same region, we experience the abrupt change in viscosity level, and also find both "stable" and "unstable" viscosity behavior as a function of time. For samples which have been neutralized partially, i.e. 0 – 96%, the viscosity appears to be constant during the time intervale of measurement. Table II summarizes the viscosity behavior of these samples of 250°C.

(i.e. extruded or injection molded) in conventional polymer processing equipment.

These examples demonstrate that polymer viscosities at 200° to 250°C. are dramatically different for the ionic polymers which are more completely neutralized as contrasted to less completely neutralized materials. It is in the temperature region from 125° to 250°C. where the ionic groups are providing the physical association which gives rise to these high viscosities. If the polymers are less completely neutralized it is believed that the free acid plasticizes these ionic groups and markedly lowers the measured viscosities. While viscosities are an excellent quantitative measurement of the degree of this measurement, other techniques could also be employed. For example, tensile strengths of the ionic polymers at high temperatures (at 150° to 200°C.) also reveal higher tensile strength for the more completely neutralized polymers.

EXAMPLE 2

It has been shown in Example 1 that the melt viscosity of lightly sulfonated polystyrene, when fully neutralized, is substantially higher than that of the unneutralized acid form. In this respect it has been clearly shown that such materials which have been neutralized to a level of 97% or greater are dramatically different from those described by Rees. This example will further document such differences. Rees (U.S. Pat. No.

TABLE II

VISCOSITY DATA FOR THE FREE ACID FORM OF SULFOPOLYSTYRENE
AND PARTIALLY NEUTRALIZED PRODUCTS PREPARED THEREFROM

| Sample | % Neutral- ization | Capillary | 250°C. Melt Index Rheometer Data Shear Stress dynes/cm$^2$ | Time Interval of Measurement min. | Initial Viscosity poise × 10$^{-4}$ | Comments |
|---|---|---|---|---|---|---|
| Free Acid, A | 0 | 0.05 × 0.5 | 1.1 × 10$^5$ | 0.5 – 3 | 1.7 ± 0.1 | Stable |
| B | 27 | 0.05 × 0.5 | 1.1 × 10$^5$ | 1.5 – 10 | 4.5 | Stable |
| C | 54 | 0.05 × 0.5 | 1.1 × 10$^5$ | 3 – 75 | 30 | Increasing |
| E | 91 | 0.05 × 0.5 | 1.1 × 10$^5$ | 18 – 75 | 230 | Stable |
| G | 97 | 0.08 × 0.3 | 2.8 × 10$^5$ | 9 – 64 | 370 | Slow drop |
| G | 97 | 0.08 × 0.3 | 1.0 × 10$^6$ | 3 – 24 | 700 | Rapid drop followed by leveling off |
| H | 100 | 0.05 × 0.5 | 1.1 × 10$^5$ | 53 – 166 | 570 | Stable |
| H | 100 | 0.08 × 0.3 | 1.0 × 10$^6$ | 2 – 16 | 959 | Rapid drop |
| A-2 | 102 | 0.08 × 0.3 | 1.0 × 10$^6$ | 22 – 145 | 8200 | Typical Stable |
| A-3 | 102 | 0.08 × 0.3 | 1.0 × 10$^6$ | 24 – 120 | 8200 | Typical Stable |
| A-1 | 103 | 0.08 × 0.3 | 1.0 × 10$^6$ | 20 – 92 | 3900 | Typical Stable |
| -J | 108 | 0.08 × 0.3 | 1.0 × 10$^6$ | 15 – 95 | 5800 | Typical Stable |

It is well known in the polymer art that as polymer melt viscosity increases above a certain level conventional polymer processing becomes extremely difficult. (To be technically precise shear stress over a range of shear rates should be employed rather than simple melt viscosity. However, melt viscosity can be employed at the low shear rates shown for the data in Table II.)

It is apparent that values of the melt viscosity at 250°94 C. are on the order of 4 × 10$^6$ to 8 × 10$^7$ poise for sulfo-polystyrene which is at least 97% neutralized. These viscosity values clearly are at least 10-fold and up to 300-fold higher than the viscosity of the same polymer sample neutralized to a level of 54%. These enormously high viscosity values are achieved at extremely high temperatures (250° C.) as well. Clearly the viscosity behavior of these more completely neutralized materials (> 97%) is approaching that of chemically crosslinked polymers. As such, these more completely neutralized polymers cannot be processed 3,322,734) states concerning his compositions that "when molten and subjected to shear stresses which occur during melt fabrication, the ionic links of these polymers are ruptured and the polymers exhibit melt flow characteristics essentially the same as the average of the base linear copolymer."

This example will show how a lightly sulfonated polystyrene (1.71 mole % sodium sulfonate, fully neutralized) compared in viscosity to that of the unsulfonated polystyrene. Because of the tremendous difference in viscosity for these two materials, the polystyrene measurements were conducted at 190°C., while the sulfonated polystyrene measurements were conducted at 240°C. This difference in temperature only serves to further accentuate the different rheological behavior of these systems. The viscosity measurements were conducted in an Instron Capillary Rheometer with capillary dimensions of 0.05034 inch diameter by 1.0074 inch length.

TABLE III

COMPARISON OF FLOW BEHAVIOR OF SULFONATED PS AND POLYSTYRENE
(240°C. and 190°C. RESPECTIVELY)

| Shear Rate, sec$^{-1}$ | Polystyrene at 190°C. | | Sulfo-Polystyrene at 240°C. | |
|---|---|---|---|---|
| | Shear Stress dyn/cm$^2$ | Apparent Viscosity, Poise | Shear Stress cyn/cm$^2$ | Apparent Viscosity, Poise |
| 0.29 | 39,010 | 132,732 | 2,535,650 | 8,627,594 |
| 0.73 | 70,218 | 95,574 | 3,081,790 | 4,194,624 |
| 1.47 | 124,832 | 84,920 | 3,627,930 | 2,469,669 |
| 2.94 | 195,050 | 66,366 | 5,110,310 | 1,738,792 |
| 7.35 | 343,288 | 46,725 | 7,958,040 | 1,033,169 |
| 14.7 | 491,526 | 33,460 | 10,766,760 | 732,931 |
| 29.4 | 686,576 | 23,361 | 14,433,700 | 491,109 |
| 73.5 | 975,250 | 13,274 | 19,895,100 | 270,792 |
| 147 | 1,263,924 | 8,604 | 22,235,700 | 151,366 |
| 294 | 1,560,400 | 5,309 | | |
| 735 | 2,051,920 | 2,793 | | |
| 1469 | 2,520,046 | 1,715 | | |

It is clear from the data in Table III that even the exceptionally high temperature of 240°C. is not sufficient to bring the viscosity of Sulfo-Polystyrene down within the vicinity of polystyrene, even though the latter is measured 50°C. lower in temperature. It is clear that conventional polymer fabrication methods are completely inadequate to handle the melt fabrication (such as extrusion) of polymers such as Sulfo-Polystyrene.

It is clear from the above rheological measurements that not even the combination of very high temperature and high shear stress are adequate to lower the polymer viscosities of Sulfo-Polystyrene to that of conventional polymers. This rheological behavior of these unmodified ionic polymers is very similar to that of chemically crosslinked polymers and completely precludes practical fabrication techniques. In this respect the polymers of this invention are clearly distinct from those of U.S. Pat. No. 3,322,734.

This invention teaches how to fabricate such materials into novel and useful foams which retain many of the unusual characteristics inherent in these systems.

EXAMPLE 3

Effect of Neutralization level on Polymer Sulfonic Acid Thermal Stability

An ethylene-propylene ethylidine norbornene terpolymer (composition of 50% ethylene, 45% propylene, 5% ethylidene norbornene) having a Mooney viscosity (212°F.) of about 40 is dissolved in hexane and sulfonated using acetyl sulfate at 25°C. Acetyl sulfate is prepared by the reaction of sulfuric acid and acetic anhydride. The polymer reacts readily within ½ hour and the resulting polymer sulfonic acid is found to contain about 30 milliquivalents of sulfonic acid per 100 grams of polymer. This level of sulfonic acid corresponds to about 1 mole percent of sulfonic acid in the polymer suggesting that about 60% of the residual unsaturation is sulfonated.

The polymer solution is separated into 4 parts. Part A is isolated as the free polymer sulfonic acid by the addition of 10 volume percent isopropanol and the resulting solution is steam stripped to remove hydrocarbon solvent. The resulting crumb is the polymer sulfonic acid containing a substantial quantity (over 50 weight %) of water.

Part B is partially neutralized by the addition of zinc stearate. The amount of zinc stearate added is that required to neutralize 25% of the free sulfonic acid groups. The resulting viscous polymer solution is then treated as described with Part A: addition of isopropanol and steam stripped. The product is the partially neutralized water swollen polymer sulfonic acid.

Part C is neutralized to a level of 75% with zinc stearate and recovered as described with Part B.

Part D is fully neutralized to a level of about 110% that of the free sulfonic acid to insure complete neutralization and avoid the presence of any substantial sulfonic acid. The product is isolated as with Part B.

The four samples, A, B, C, D are then dried on a 2-roll mill heated to about 125°C. Part A is placed on the mill and initially a substantial amount of water is squeezed out of the polymer simply by compression. After several minutes the material begins to sheet out on the mill to form a coherent mass. As the temperature of the polymer increases a pronounced darkening is observed and after about 5 minutes of shear the polymer sulfonic acid is dark or almost black in appearance. The odor of strongly acidic species is quite evident.

Part B is treated the same way as Part A. The thermal stability appears somewhat better but the final product is very dark.

Part C is treated the same way and appears brown in the dried state.

Part D appears to possess considerably better thermal stability, the color of the product after thermal abuse is tan. Relatively little pungent or acidic odor is observed.

The four dried samples are then compression molded at temperatures of 300°F. using standard compression molding equipment. The molding conditions are preheating the samples for 3 minutes followed by a 7 minute heating at a pressure of 10,000 psi. The resulting compression molded pads are about 40 mil thick. The free acid sample, Part A, is virtually black in appearance. Part B is dark brown, Part C is brown, Part D is tan in appearance.

It is evident from these materials that the sample which is fully neutralized has substantially better thermal stability than the other materials. It is evident that the presence of free sulfonic acid in the polymer gives rise to substantial degradation as determined by both color development and the presence of acidic fumes. This degradation severe sufficiently severs as to obviate the use of many types of polymer handling equipment.

It is to be emphasized that the free polymer sulfonic acid species described herein differs substantially from those polymers containing free carboxylic acid such as acrylic acid copolymers. In the case of the sulfonic acid-containing polymer described herein, decomposition can readily occur if significant (greater than 3% of total ionic species) amounts of sulfonic acid are present.

EXAMPLE 4

Foaming of Lightly Sulfonated Polystyrene Plasticized With Methanol

A pad 0.040 inches thick was molded at 260°C. from a powder of lightly sulfonated polystyrene having about 7 mole percent sulfonate content with sodium as the counter ion (100% neutralization). The pad was put in a pressure vessel in a solution of 0.7 ml methanol and 10 ml freon 12; and it was heated to 71°C. After 5 days the pad was removed and foamed in silicone oil at 275°C. The foam had an excellent fine cell structure and a density of 6.5 pcf. The foam is rigid at room temperature and shows no collapse when held at 125°C. for ½ hour. This foam has resistence to dissolving in toluene and similar solvents unlike conventional polystyrene foam; the latter almost immediately collapses when exposed to toluene, while this lightly sulfonated polystyrene foam only shrunk slightly when exposed to toluene. This experiment demonstrated that lightly sulfonated polystyrene foams have improved heat stability and solvent resistences as compared to polystyrene foams, due to the physical cross-links.

A measurement was made of the dimensional stability of a methanol plasticized lightly sulfonated polystyrene foam having 3 mole percent sulfonation and a sodium counterion as compared with a commercial polystyrene foam from a coffee cup. After remaining at 125°C. overnight, the polystyrene foam had collapsed to 14% of its original volume, while the lightly sulfonated polystyrene foam had only decreased to 77% of its original volume. It is clear from this experiment that sulfonated polystyrene foam manifests markedly superior dimensional stability as contrasted to polystyrene foam at elevated temperatures.

EXAMPLE 5

Foaming of Non-Plasticized Lightly Sulfonate Polystyrene

A molded pad 0.035 inches thick of lightly sulfonated polystyrene having approximately 3 mole percent sulfonation with sodium or the counter ion was immersed in freon 12 in a pressure vessel at 70°C. for 3 days (the polymer was 100% neutralized). Pieces of the pad were then foamed in silicone oil at 150°C. and at 200°C. The resulting foams has densities of greater than 20 pcf and they are shrivelled with poorly shaped cells. This illustrates that a polar plasticizer is necessary to achieve suitable foams of neutralized sulfonated polymers. Thus, conventional foaming technology as described in this example which, when applied to conventional thermoplastics such as polystyrene, results in excellent cell structure is not operable to the polymers claims in this invention.

EXAMPLE 6

Preparation of a Rigid Foam

One part of a 100% neutralized sulfonated plastic (a lightly sulfonated polystyrene wherein sodium sulfonate groups were attached to 1.8 mole % of the styrene units) was blended intimately with 1 part of a solvent mixture (80% by weight of benzene and 20% by weight of methanol). Also 0.01 parts of finely divided MgO was added as a nucleating agent. The mixture was mixed thoroughly to yield a viscous but fairly homogeneous mass, and was placed in a metal container. The container was placed in a forced air oven at 125°C. Within 15 minutes, a foamed product of excellent cell structure resulted which remained intact. The product was permitted to remain at 125°C. for ½ hour and then removed, and cooled to room temperature. The cell structure was maintained.

EXAMPLE 7

Foaming of Polystyrene Control

An attempt to repeat Example 6 however, substituting finely divided high molecular weight polystyrene, homopolymer resulted in a collapse of the foam structure to yield an unfoamed film with a few large bubbles dispersed in it.

EXAMPLES 8, 9, 10 and 11

A series of experiments designed to test the influence of volatile solvent and amount of domain plasticizer was attempted as follows:

TABLE IV

|  | Example 8 | Example 9 | Example 10 | Example 11 |
| --- | --- | --- | --- | --- |
| Parts Sulfonated Polymer | 0.5 | 0.5 | 0.5 | 0.5 |
| Parts Dioctyl Phthalate-Plasticizer | 1.0 | 1.0 | 1.0 | 1.0 |
| Parts Methanol | 0.2 | 0.2 | 0.05 | 0.05 |
| Parts MgO | .01 | .01 | .01 | .01 |
| Parts Benzene | 1.0 | — | 1.0 | — |
| Parts Toluene | — | 1.0 | — | 1.0 |
| Foam Appearance | Fair Foam, Uneven Cell Structure, Part Collapsed | Better than Exp.3, Uneven Cell Structure, Partially Collapsed | Good Foam, Elastic Fairly Even Cell Structure, Tough | Very Good Foam, Elastic Tough, Good Even Cell Structure |

In all cases the ingredients were combined by mixing with a spatula in a small metal cup to obtain a homogeneous mass. The products were then placed in an oven at 125°C. for 30 minutes, removed and cooled. In Example 11, the foam density was measured by displacement of water and found to be 0.532 g/cc or 33.3 lbs./cu. ft. These experiments demonstrate that tough flexible foams of good cell structure can be achieved by this approach. Examples 8 and 9 demonstrate that the amount of polar cosolvent can markedly influence the cell structure of the foam. It is preferable to use a minor amount of the polar cosolvent since if too much is present, the foam may partially collapse because the polar cosolvent has not completely volatilized at the time when the blowing agent has achieved a minimum foam density.

Examples 10 and 11 compare blowing agents of different volatility. At the particular time and temperature employed (125°C.) it is evident that the use of a less volatile blowing agent (toluene) resulted in a better cell structure than with the more volatile one (benzene).

EXAMPLE 12

This example demonstrates the reuse of a rigid plastic foam of this invention. One part of the rigid foamed product of Example 6 is blended with 1 part of a solvent mixture (80% by weight of benzene and 20% by weight of methanol). The mixture becomes semi-fluid and the foamed structure readily collapses. The mixture becomes viscous but homogeneous and is placed in a metal container and then in a forced air oven maintained at a temperature of 125°C. Within 15 minutes, a foamed product of excellent cell structure is achieved which does not collapse after an additional ½ hour exposure at 125°C. The product is then removed and cooled to room temperature. The cell structure is maintained and appears comparable to that of the original foamed sample of Example 6. This same process can be repeated several times.

EXAMPLE 13

A copolymer of poly t-butylstyrene with isoprene (about 7.0 wt. % isoprene) was sulfonated and fully neutralized to obtain the predominately poly t-butylstyrene copolymer containing about 2.4 weight percent sodium sulfonate groups. The sulfonate polymer was finally divided by pulverizing with a high shear blender, and then screened through a 100 mesh screen. The particle diameter was estimated at 150 microns. A blend of 0.5 parts of this sulfonated polymer and 1.0 parts of an oil based on paraffinic and naphthenic hydrocarbons having an average molecular weight of about 500 was prepared. To this blend (a liquid suspension) about 0.01 parts is isopropanol was added, and the resultant mixture was stirred until homogeneous.

This product was placed into an open mold and heated rapidly to a temperature in excess of 100°C. A foamed product was created which showed no tendency to shrink even when held at elevated temperature in excess of 200°C. The product, when cooled, was flexible, tough, and appeared to possess a good uniform cell structure. The foam density was estimated to be about 25 lbs. per cubic foot. In this experiment, we have shown that isopropanol can be simultaneously employed as the blowing agent and the volatile polar compound.

What is claimed is:

1. A foamed polymeric product comprising an ionic polymer, said ionic polymer comprising from about 0.4 to 10 mole percent pendant acid groups, said pendant acid groups being selected from the group consisting of sulfonic, carboxylic and phosphonic acid groups, and said pendant acid groups being neutralized to a degree of at least 97%.

2. The product of claim 1 further characterized as having a density of from about 1 to 50 lbs. per cubic foot.

3. The product of claim 1 further characterized as being neutralized by a neutralizing agent selected from the group consisting of (1) ammonia, (2) $C_1$ to $C_{30}$ amines, (3) basic compounds selected from Groups I and II of the Periodic Table of the Elements, and (4) basic compounds selected from the group consisting of lead, tin and antimony, and (5) mixtures thereof.

4. The product of claim 3 wherein said ionic polymer is a sulfonated polymer selected from the group consisting of polystyrene, isobutylene-isoprene copolymers, ethylene-propylene-5-ethylidene-2-norbornene terpolymers, and polybutadiene.

5. The product of claim 4 further characterized as being neutralized by a neutralizing agent selected from the group consisting of the hydroxides, oxides, and $C_1$ and $C_{20}$ alkoxides and carboxylates of magnesium, barium, calcium, potassium, sodium, and mixtures thereof.

6. The product of claim 5 being further characterized as being neutralized to a degree of at least 100%.

7. The product of claim 3 wherein said ionic polymer is a sulfonated polystyrene.

8. The product of claim 3 wherein said ionic polymer is a sulfonated isobutylene copolymer.

9. The product of claim 3 wherein said ionic polymer is a sulfonated ethylene-propylene terpolymer.

10. The product of claim 3 wherein said ionic polymer is a sulfonated ethylene copolymer with a nonconjugated diene.

11. The product of claim 3 wherein said ionic polymer is sulfonated propylene copolymer with a nonconjugated diene.

12. The product of claim 1 further characterized as having a density of from about 5 lbs/cu. ft. to 30 lbs/cu. ft.

13. The composition of claim 1 wherein said pendant acid groups are sulfonic acid groups.

* * * * *